United States Patent
Hatcher et al.

(10) Patent No.: US 11,113,723 B1
(45) Date of Patent: Sep. 7, 2021

(54) EXPLICIT USER HISTORY INPUT

(71) Applicant: T-Mobile Innovations LLC, Overland Park, KS (US)

(72) Inventors: Tanya S. Hatcher, Spring Hill, KS (US); Bryce A. Jones, Overland Park, KS (US); Rodney D. Nelson, Overland Park, KS (US); Mark D. Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 62 days.

(21) Appl. No.: 16/231,233

(22) Filed: Dec. 21, 2018

Related U.S. Application Data (62) Division of application No. 14/724,780, filed on May 28, 2015, now Pat. No. 10,229,431.

(51) Int. Cl.
  *G06Q 30/02* (2012.01)
  *H04L 29/08* (2006.01)
  *H04L 29/06* (2006.01)

(52) U.S. Cl.
  CPC ..... *G06Q 30/0255* (2013.01); *G06Q 30/0267* (2013.01); *H04L 67/02* (2013.01)

(58) Field of Classification Search
  None
  See application file for complete search history.

(56) References Cited

U.S. PATENT DOCUMENTS

| | | | |
|---|---|---|---|
| 6,418,440 B1 | 7/2002 | Kuo et al. | |
| 6,473,084 B1 | 10/2002 | Phillips et al. | |
| 8,180,776 B2 | 5/2012 | Haveliwala et al. | |
| 8,181,116 B1 | 5/2012 | Amacker et al. | |
| 8,255,464 B2 | 8/2012 | Wilkins | |
| 8,694,374 B1 | 4/2014 | Diligenti et al. | |
| 10,229,431 B1 | 3/2019 | Hatcher et al. | |
| 2003/0233418 A1 | 12/2003 | Goldman | |
| 2004/0103159 A1 | 5/2004 | Williamson et al. | |
| 2005/0144064 A1 | 6/2005 | Calabria et al. | |
| 2005/0149880 A1 | 7/2005 | Postrel | |
| 2009/0125827 A1* | 5/2009 | Zeigler | G06F 16/9574 715/765 |
| 2010/0042499 A1* | 2/2010 | Barton | G06Q 30/02 705/14.53 |

(Continued)

OTHER PUBLICATIONS

=FAIPP Pre-Interview Communication dated Oct. 17, 2017, U.S. Appl. No. 14/724,780, filed May 28, 2015.

(Continued)

*Primary Examiner* — Bion A Shelden (57) ABSTRACT

A communication server is disclosed. The communication server comprises a processor, a memory, and an application stored in the memory. The application, when executed by the processor, receives a request that identifies a subject to remove from a user history of the a user equipment (UE), wherein the user history is compiled based on communication events initiated by the UE and is associated with content that is sent to the UE. The application, responsive to receiving the request from the UE, transmits a user history modification request to a history management server, wherein the communication server disassociates the subject from the user history identified in the request received from the UE.

18 Claims, 9 Drawing Sheets

(56) References Cited

U.S. PATENT DOCUMENTS

| | | | |
|---|---|---|---|
| 2010/0180001 A1* | 7/2010 | Hardt | G06Q 50/01 709/207 |
| 2011/0106613 A1 | 5/2011 | Felt et al. | |
| 2011/0258560 A1 | 10/2011 | Mercuri et al. | |
| 2011/0295612 A1* | 12/2011 | Donneau-Golencer | G06Q 30/02 705/1.1 |
| 2011/0321167 A1 | 12/2011 | Wu et al. | |
| 2012/0060062 A1* | 3/2012 | Lin | G06Q 10/00 714/48 |
| 2012/0158472 A1* | 6/2012 | Singh | G06F 16/29 705/14.4 |
| 2012/0278173 A1 | 11/2012 | Vaidyanathan et al. | |
| 2013/0086607 A1 | 4/2013 | Tom et al. | |
| 2013/0290101 A1 | 10/2013 | Arini et al. | |
| 2014/0172544 A1* | 6/2014 | Rabkin | G06Q 50/01 705/14.44 |
| 2015/0201036 A1* | 7/2015 | Nishiki | H04L 67/1095 709/224 |
| 2015/0350742 A1* | 12/2015 | Oh | H04N 21/8153 725/46 |

OTHER PUBLICATIONS

Final Office Action dated Jan. 3, 2018, U.S. Appl. No. 14/724,780, filed May 28, 2015.
Advisory Action dated Mar. 20, 2018, U.S. Appl. No. 14/724,780, filed May 28, 2015.
Office Action dated Jun. 27, 2018, U.S. Appl. No. 14/724,780, filed May 28, 2015.
Notice of Allowance dated Oct. 24, 2018, U.S. Appl. No. 14/724,780, filed May 28, 2015.

* cited by examiner

EXPLICIT USER HISTORY INPUT

CROSS-REFERENCE TO RELATED APPLICATIONS

This application is a divisional of and claims priority under 35 U.S.C. § 119 to U.S. patent application Ser. No. 14/724,780, filed on May 28, 2015, entitled "Explicit User History Input," by Tanya S. Hatcher, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user equipment (UE) may be one or more of a mobile phone, a media player, a tablet computer, a laptop computer, a personal digital assistant (PDA), or another device. UEs may have the ability to access the internet via a web browser application on the UEs. When UEs visit websites via the web browser application, an advertisement server may be consulted to fulfill advertisement requests. The advertisement server may be communicatively coupled to a plurality of user history managers that keep record of the user histories of UEs, wherein user histories are internet viewing records that comprise a list of web sites visited and advertisements that have been clicked, viewed, or visited. The advertisement server may use the user history to select an advertisement to send to the UEs, when the UEs make advertisement requests.

SUMMARY

In an embodiment, a history moderator server is disclosed. The server comprises a processor, a memory, and an application stored in the memory, that when executed by the processor receives from a user equipment (UE) a request that identifies a subject to remove from a user history of the UE, wherein the user history is compiled based on communication events initiated by the UE and is associated with content that is sent to the UE wherein the subject is identified via metadata that is a part of the request, wherein the subject is identified via a key word, wherein the key word is a one word description of the advertisement. The application, responsive to receiving the request from the UE, transmits a user history modification request to a history manager server, wherein the history moderator server disassociates the subject from the user history identified in the request received from the UE, wherein the server identifies the history manager server associated with the UE via metadata in history modification request, wherein the metadata identifies the history manager server that is associated with the UE, wherein the server creates and stores the mapping to the memory of the server, wherein the history moderator server uses the mapping to identify the history manager server that is associated with the UE.

In an embodiment, a method of selectively modifying user history is disclosed. The method comprises a user equipment (UE) receiving an advertisement. The method comprises the UE determining a subject of the advertisement, wherein the UE determines a subject of the advertisement by reading metadata that is appended to the advertisement, wherein the metadata comprises a key word that identifies a subject of the advertisement, wherein the key word is one word that describes the advertisement. The method comprises the UE receiving an input to disassociate a subject of the advertisement from a user history of the UE maintained remote from the UE. The method comprises the UE transmitting a user history modification request to a history moderator server, whereby the subject of the advertisement is disassociated from the user history of the UE.

In an embodiment, a method of selectively modifying user history is disclosed. The method comprises a web browser application presenting an advertisement presentation widget on a display of a user equipment (UE), wherein the widget comprises a user input control to disassociate a subject of a received advertisement displayed in the advertisement presented in the widget from a user history of the UE. The method comprises the web browser application receiving a user input via the widget, wherein the input is a request to disassociate a subject of the advertisement from the user history. The method comprises the web browser application sending a history modification request to a history moderator server, whereby the subject of the advertisement displayed in the advertisement presentation widget is disassociated from the user history of the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and methods of selectively modifying user history is disclosed. Prior to implementation of a history moderator server that moderates requests to modify user history of a user equipment (UE), advertising companies may have distributed advertisements that comprised subjects that were not germane to the users that the advertisements were sent to. For example, a man owns a UE and may have a daughter that is going to attend her high school prom. The daughter may use her father's internet capability on the UE several times to look up prom dresses that she can go find at a store or order online. A remote user history manager server may keep track of the father's user history on his UE and may use these instances so that effective advertisements may be distributed to his UE. For the father, the subject of prom dresses is not germane to his interests, and he may become annoyed or embarrassed by advertisements for prom dresses when he has no interest in prom dresses or if his daughter has already found and bought a prom dress.

In this instance, the UE provides functionality for the father to selectively disassociate his user history from the subject of prom dresses via a user input on an advertisement presentation widget. The history moderator server moderates these requests for user history modification and is able to determine that this request for disassociation is valid via several methods. The history moderator server may reject a history modification request if the UE sends a number of history modification requests that exceeds a pre-defined threshold for history modification requests during a pre-defined period of time. For example, a man in his mid-forties may be a father and allow his daughter to view the internet using his smartphone (the UE) via a web browser application that is on the smartphone. The daughter may use the internet to search for prom dresses as she is going to attend her high school's prom in the near future. When the father receives his phone back and uses the web browser application to view the internet, the man may receive targeted advertisements of prom dresses that are based on his user history. An advertisement server may receive requests for advertisements from a history manager server that is associated with the smartphone that belongs to the man. The history manager server does not filter advertisements and sends advertisements that are related to a user history, such as the man's user history which is maintained by the history manager server.

The targeted advertisements may present a user interface (UI) widget that surrounds the advertisement displayed on a display of the smartphone. The UI widget provides a user input control that allows the man to disassociate himself from advertisements that pertain to prom dresses via a history modification request. The history modification request is sent to a history moderator server where the history moderator server keeps track of history modification requests that are submitted by users of UEs. The history moderator server determines the history manager server that is associated with the user history of the UE. The history moderator server utilizes a map builder application that helps the history moderator server keep track of the connections between a user history of a UE and the history manager that is associated with the UE.

The history moderator determines that the UE has not exceeded a pre-defined threshold for the amount of history modification requests made during a pre-defined period of time. For example, the man may input a history modification request so that prom dresses are removed his history and so that he no longer receives targeted advertisements that pertain to prom dresses. But, if the man inputs history modification requests for five different subjects during the pre-defined period of time such as a week, the man may be rejected by the history moderator server. If the man exceeds the pre-defined threshold for the pre-defined period of time, the history moderator server does not allow the history modification request to go through. This allows the man to deny certain subjects that are not germane to his interests, but also prevents the man from simply denying all advertisements from appearing allowing the history managers to continue to send targeted advertisements that are germane to the user history of the smartphone. This is a win-win for both of the parties that are involved. For the man, he no longer see advertisements for prom dresses that he does not want to see and would not click or view, and for the advertising company, the company no longer sends out advertisements that users are not likely to look at and instead distribute advertisements that a user will be more likely to click or view based on the user history. The company also has enough control over the advertisements that are sent to the man because he is only allowed a certain number of history modification requests over a pre-defined period of time.

In an embodiment, a web browser application of a UE presents an advertisement presentation widget on a display of the UE. The widget comprises a user input control to disassociate a subject of a received advertisement displayed in the advertisement presentation widget from a user history of the UE. The web browser application receives a user input via the widget. The input is related to a request to disassociate a subject of the advertisement from the user history. The web browser application determines what the subject of the advertisement is by reading a uniform resource locator (URL) that is appended to the advertisement. The web browser application, responsive to receiving the user input, sends a history modification request to a history moderator server. The history moderator server determines the subject that the web browser application wants to disassociate from the user and then determines the validity of the history modification request according to pre-defined criteria.

In an embodiment, the period of time may be a day, a week, a month, or another period of time. The user history of the UE may be included in the history modification request. The history moderator server may also consult a one of a plurality of user history manager servers, wherein the one history manager server that the history moderator server consults is associated with the user history of the UE. The history manager servers are associated with advertising companies. Each of the history manager servers are also associated with different UEs. In an embodiment, the history moderator server may also reject a history modification request if the UE is sending an amount of history modification requests that exceeds a pre-defined amount of history modification requests over a pre-defined period of time.

After validating the history modification request, the history moderator server relays the history modification request to the history manager server that is associated with the UE. The history moderator server keeps track of connections between a UE user history and the history manager server that is associated with the user history via the map builder application. The map builder application keeps track of the connections between a UE user history and the history manager server that is associated with that user history. The map builder application may keep this information stored as a table or chart that shows the connections for many UEs and the history manager servers that are associated with the UEs.

With the request received, the history manager server removes the subject included in the history modification request. With the subject removed from the user history, the web browser application of the UE may no longer receive targeted advertisements pertaining to the subject.

The history moderator server may perform the action of identifying the subject of the advertisement that the user of the UE wants to remove by "scraping" a URL from the advertisement as the URL of the advertisement may be sent in the history modification request by the UE. The advertisement may also comprise metadata that identifies a subject of the advertisement that the history moderator server may use in order to identify the subject of the advertisement. There may also be a key word stored as part of metadata by an application programming interface (API) of the history manager server that is associated with the user history of the UE. The key word may in one word describe the subject of the advertisement. The key word may be identified or "scraped" by either the UE and noted as part of the history modification request. The history moderator server may also perform this action.

With the history moderator server that receives requests to modify user histories from UEs, a win-win situation for users of UEs and advertising companies is promoted. The history moderator server is able to evaluate and determine whether requests received for user history modification are valid, where when a request for user history modification is validated, the subject that the UE has requested the history moderator server to remove from its user history may be deleted and replaced with a subject that is more germane to the user of the UE and thus more likely to be clicked or viewed on the UE.

Figure 1A:
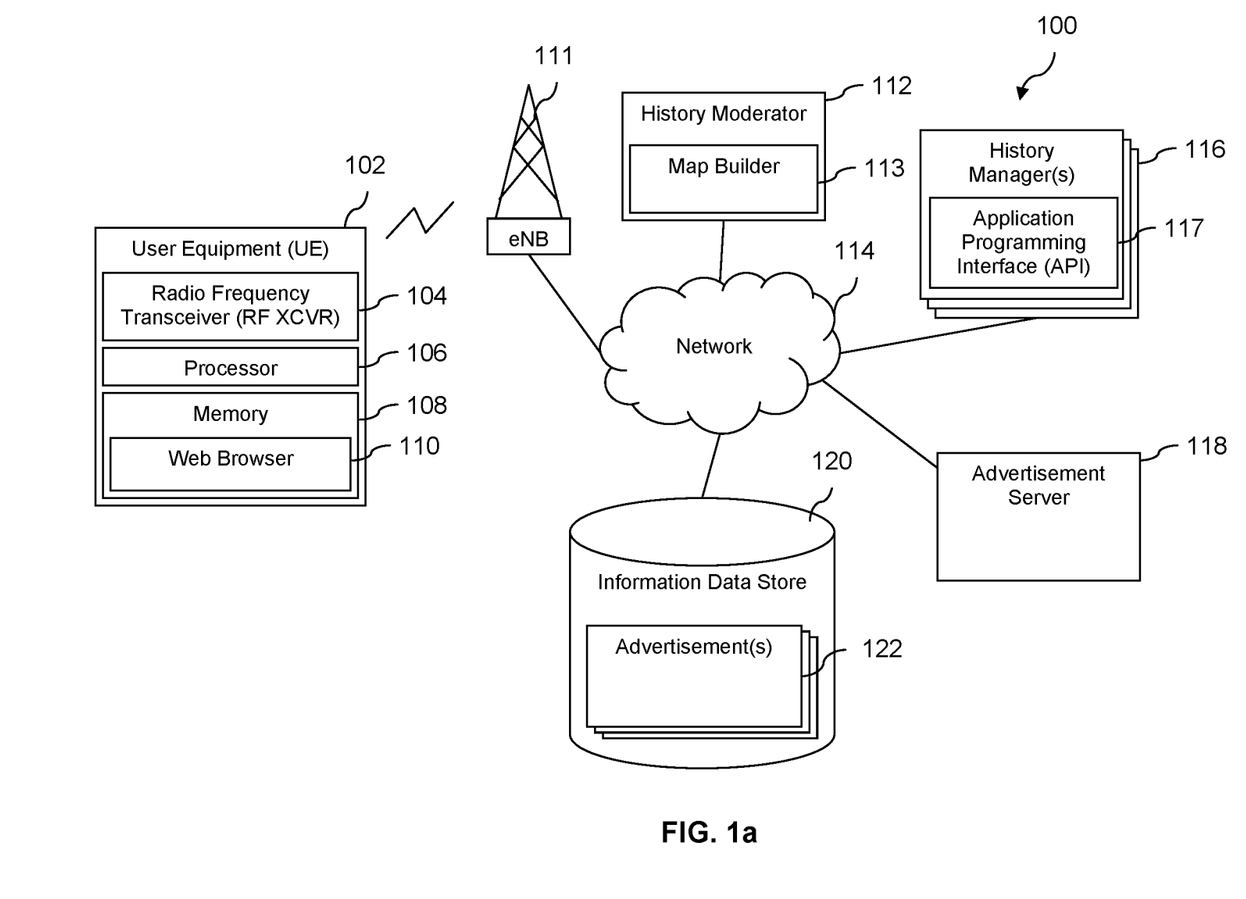
FIG. 1a is a block diagram of a system according to an embodiment of the disclosure.

Turning now to FIG. 1a, a communication system 100 is described. The system 100 comprises a user equipment (UE) 102. The UE 102 comprises a radio frequency transceiver (RF XCVR) 104, a processor 106, and a memory 108 that further comprises a web browser application 110. The system 100 further comprises an enhanced node B (eNB) 111, a user history moderator server 112 that comprises a map builder application 113, a network 114, a plurality of user history manager servers 116 that each comprise a application programming interface (API) 117, an advertisement server 118, and an information data store 120 that further comprises a plurality of advertisements 122. In an embodiment, the eNB 111, the history moderator server 112, the plurality of history manager servers 116, the advertisement server 118, and the information data store 120 are communicatively coupled to the network 114. The network 114 may be a private communication network, a public communication network, or a combination thereof.

In an embodiment, the UE 102 may be a mobile phone, a personal digital assistant (PDA), a media player, a tablet computer, a laptop computer or another device. The eNB 111 may be used to communicatively couple the UE 102 to the network 114. In an embodiment, the eNB 111 may provide a communication link to the UE 102 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol.

The radio frequency transceiver (RF XCVR) 104 may be used to communicatively couple the UE 102 to the history moderator server 112 and the advertisement server 118. The processor 106 may be used to execute the web browser application 110. The web browser application 110 that is stored in the memory 108 may request for and receive advertisements such as the advertisements in the plurality of advertisements 122 stored in the information data store 120 from the advertisement server 118. For example, to fill an advertisement opportunity in displayed content such as a social network individual home page. The web browser application 110 presents the received advertisement 122 within an advertisement presentation widget on a display of the UE 102, as if within a picture frame or window. The advertisement presentation widget may comprise a user input (UI) control that allows the UE 102 to disassociate a subject of the advertisement 122 from a user history that is associated with the UE 102. The user history may comprise records or row entries of clicks, views, or visits made to various websites and advertisements that have been executed on the UE 102 via the web browser application 110. The user history, as stored by the one of the plurality of history manager servers 116, may comprise information about events, such as advertisement clicks or views and time stamps associated with those events. The user history may further comprise user facts, such as an age of a user of the UE 102, a gender of a user, an education level of a user, a marital status of the user, a number of children of a user, a zip code of a user, and other user facts.

The history moderator server 112 receives history modification requests from the user equipment 102, e.g., from the widget control. The history moderator server 112 may evaluate the history modification requests from the UE 102. The history moderator server 112 may reject these history modification requests if the requests do not meet pre-defined criteria to validate user history modification. In an embodiment, the pre-defined criteria may comprise the history moderator server 112 evaluating a percentage of clicks or views of the subject that the UE 102 is requesting to disassociate from its user history over a pre-defined period of time. The percentage may be five percent of clicks or views recorded in the user history, ten percent of clicks or views recorded in the user history, fifteen percent of clicks or views recorded in the user history, or another percentage of clicks or views of the subject recorded in the user history. In an embodiment, the period of time may be a day, a week, a month, or another period of time. The web browser application 110 may append the local user history of the UE 102 to the history modification request which the history moderator server 112 may use to validate the history modification request.

The map builder application 113 identifies the history manager server 116 that is associated with the user history of the UE 102 via mappings that it develops. In an embodiment, there may be metadata that is a part of the history modification request from the UE 102 that comprises information of the history manager server 116 that is associated with the UE 102. This metadata may be put in the advertisement 122 that is sent by the advertisement server 118 via the history manager server 116 via the API 117 that relays the request for an advertisement 122 to the advertisement server 118. The metadata may comprise a tag that is associated with the history manager server 116 that the request for an advertisement 122 was relayed to by the UE 102. This mapping between the UE 102 and the history manager server 116 may be stored to an internal memory of the history moderator server 112 in a variety of ways that may comprise a table, a chart, or another method of storage. There may be multiple UEs 102 within the system 100 and some of the UEs 102 may be associated with different history manager server 116 and some may be associated with the same history manager server 116.

Association between UEs 102 and history manager servers 116 may be determined according to the region that a user of the UE 102 is located in. Association may also be determined by the telecommunication service provider that the user of the UE 102 is associated with. In an embodiment, the map builder application 113 allows for rapid intake of history modification requests from the UE 102 and other UEs 102. By being able to identify the history manager server 116 that the UE 102 is associated with by simply reading metadata that is a part of the history modification request, the history moderator server 112 spends less time finding the source of the history manager server 116 that is associated with the user history of the UE 102. The map builder application 113 allows the history moderator server 112 to access the history manager server 116 that is associated with maintaining the user history of the UE 102 more quickly so that the history moderator server 112 can determine that a history modification request sent by the UE 102 is valid.

The user history that the UE 102 may append to a user history modification request may be locally stored to the web browser application 110 that is comprised of a local count/history of communication events engaged in by the web browser application 110. The local user history maintained by the web browser application 110 may be secure from tampering, for example by the user of the UE 102. The user history moderator server 112 may consult one of the plurality of user history manager servers 116, so that the history moderator server 112 may evaluate the user history of the UE 102, wherein the one history manager server 116 is associated with the UE 102 and maintaining the user history of the UE 102, remotely from the UE 102.

If the history moderator server 112 validates a history modification request, the history moderator server 112 may redirect and transmit the request to one of the plurality of history manager servers 116, wherein the one of the plurality of history manager servers 116 is associated with the user history of the UE 102. The history moderator server 112 may also reject the history modification request if the UE 102 via the web browser application 110 has sent an amount of history modification requests that exceed a pre-defined threshold of history modification requests over a predefined period of time. The pre-defined threshold for history modification requests allowable for the web browser application 110 to request may be one of one history modification request per week, two history modification requests per week, one history modification request per month, two history modification requests per month, five history modification requests per month, or another number of history modification requests for another pre-defined period of time. By limiting the amount of validated history modification requests made by the UE 102 via the web browser application 110, the history moderator server 112 prevents the UE 102 from disassociating itself from the subject of all advertisements 122. In an embodiment, the pre-defined criteria for validating a history modification request may be a percentage of topics viewed over a pre-defined period of time as opposed to a percentage of clicks, views or visits over a pre-defined period of time. For example, the user history of the UE 102 may comprise many topics that have been viewed such as wine, fine food, hunting, craft beer, museums, prom dresses, Italian restaurants, musical artists, wine regions of France, meteor showers, music festivals, hamburger restaurants, etc. If a user of the UE 102 wants to disassociate from one of these topics, for example, prom dresses, the history moderator server 112 may validate the history modification request sent by the UE 102. If the UE 102 tries to send a history modification request for multiple topics, the history moderator server 112 may reject history modification requests exceeds a pre-defined threshold number or percentage of topics.

In an embodiment, the history manager server 116 may use APIs 117 to implement functionality of responding to advertisement requests from the UE 102. The APIs 117 maintain the user history that is associated with the browsing performed by the web browser application 110 of the UE 102. The APIs 117 insert metadata into the advertisements 122 that are sent to the UE 102 in the event of an advertisement request from the UE 102. The metadata comprises a subject of the advertisement 122 using a key word. Key words may be used by either the UE 102 or the history moderator server 112 to identify a subject of the advertisement 122 in the event of a history modification request made by the UE 102. The API 117 that is associated with the history manager server 116 that is associated with the UE 102 sends the information of the metadata to the advertisement server 118 in the event that the advertisement server 118 receives an advertisement request from the UE 102.

The advertisement server 118 may be communicatively coupled to the UE 102 and may receive requests from the UE 102 for advertisements such as the advertisements 122 to display. Respective to a request for an advertisement 122 from the UE via the web browser application 110, the advertisement server 118 may select one of the advertisements 122 from the information data store 120 based on the user history of the UE 102. In an embodiment, the user history may be gathered by the advertisement server 118 from the history manager server 116 that is associated with the UE 102. When the advertisement server 118 determines an advertisement 122 to send to the UE 102 based on the user history of the UE 102 gathered from the history manager server 116. While one UE 102, one eNB 111, one history moderator server 112, three history manager servers 116, one advertisement server 118, and one information data store 120 are illustrated in FIG. 1, it should be understood that the system 100 may comprise any number of UEs 102, eNBs 111, history moderator servers 112, history manager servers 116, advertisement servers 118, and information data stores 120.

In an embodiment, an application is executed by a processor of the history moderator server 112 where the history moderator server 112 receives from the UE 102 a request that identifies a subject to remove from a user history of the UE 102. The user history is comprised of a list of web sites and advertisements that have been clicked, viewed, or visited by the web browser application 110 of the UE 102. The user history may be compiled based on communication events by the UE 102 and is associated with content that is sent to the UE. The history moderator server 112, responsive to receiving the request from the UE 102, transmits a user history modification request to one of the plurality of history manager servers 116. In an embodiment, each of the history manager servers 116 may be associated with separate advertisement agencies or companies or user history creation and maintenance companies. The history manager servers 116 may keep track of user histories of UEs such as the UE 102. One of the plurality of history manager servers 116 may have the rights to define advertisements sent to the UE 102 based on the user history of the UE 102 that the history manager server 116 maintains remotely.

In an example of the system 100, a man may own the UE 102 and may have a daughter that is going to attend her high school prom. The daughter may use her father's web browser application 110 on the UE 102 several times to access the internet to look up prom dresses that she can go find at a store or order online. One of the plurality of history manager servers 116 may keep track of the father's user history on the UE 102 and may use these instances so that effective advertisements 122 can be distributed by the advertisement server 118. For the father, the subject of prom dresses is not relevant to his interests, and he may become annoyed by advertisements 122 for prom dresses when he has no interest in prom dresses or if his daughter has already found and bought a prom dress.

In this instance, the UE 102 provides functionality for the father to selectively disassociate his user history from the subject of prom dresses via a user input on an advertisement presentation widget which results in the UE 102 via the web browser application 110 transmitting a user history modification request to the history moderator server 112. The history moderator server 112 moderates these requests for user history modification and is able to determine that the history modification request for disassociation from the subject of the advertisement 122 is valid via several methods. The history moderator server 112 may be able to evaluate the father's user history and determine the percentage of clicks or views of prom dresses over a pre-defined period of time, if the amount of clicks or views exceeds a pre-defined threshold of clicks or views, the history moderator server 112 denies this request. If the amount of clicks or views does not exceed the pre-defined threshold, the history moderator server 112 validates the history modification request and relays the request to the history manager server 116 that is able to disassociate the subject of prom dresses from the father's user history so he does not have to see advertisements 122 that pertain to prom dresses.

Figure 1B:
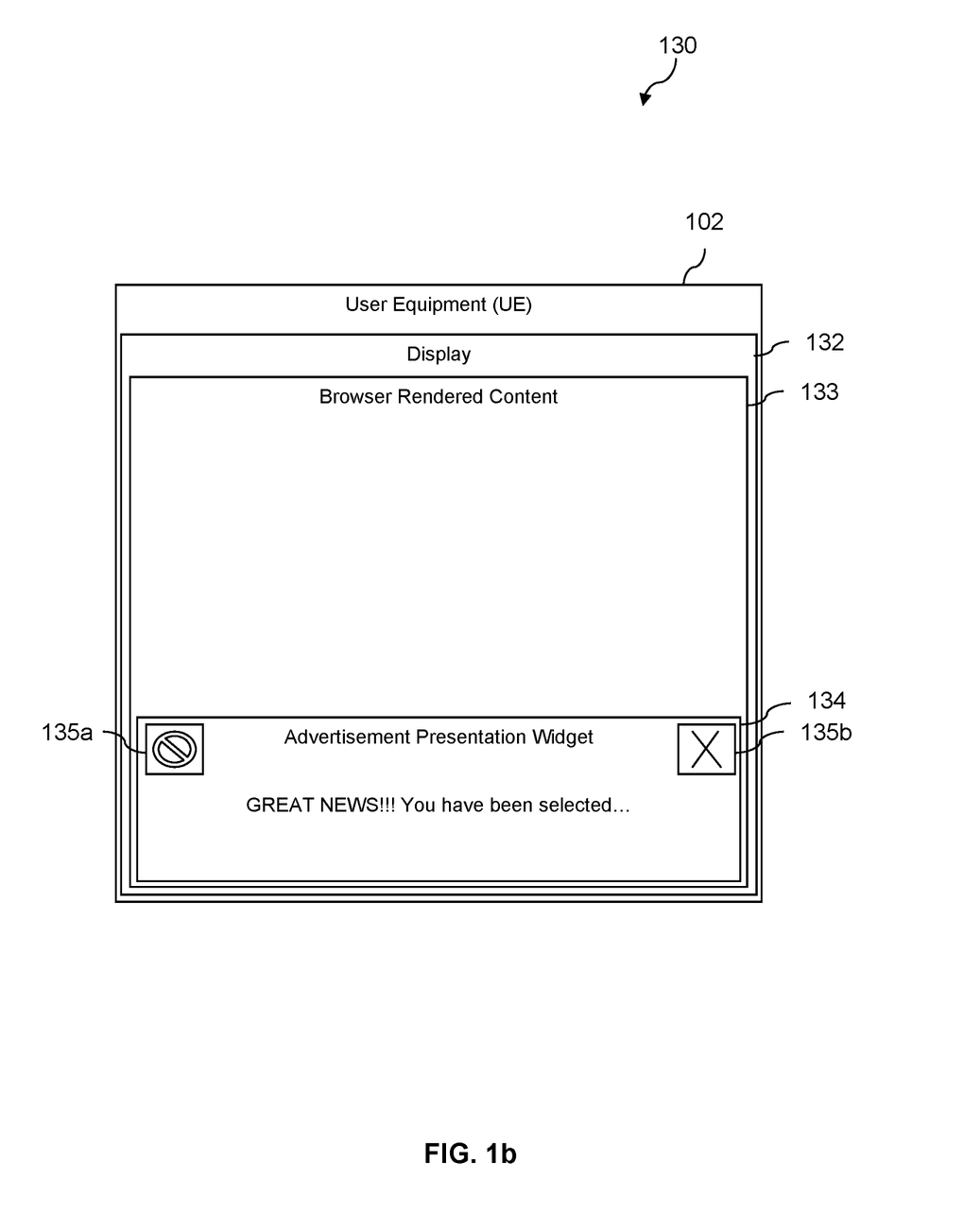
FIG. 1b is a block diagram of a system according to an embodiment of the disclosure.

In FIG. 1b, a system 130 is described. The system 130 comprises the user equipment (UE) 102 that is substantially similar to the UE 102 presented in FIG. 1a, and a display 132 of the UE 102. The display 132 presents browser rendered content 133 which displays an advertisement presentation widget 134 as part of the browser rendered content 133. The advertisement presentation widget 134 comprises a first user input (UI) control 135a, and a second UI control 135b. The first UI control 135a and second UI control 135b are a part of an initial advertisement that is displayed by the UE 102 as part of the advertisement presentation widget 134. The first UI control 135a provides the UE 102 the functionality to disassociate the UE 102 from a subject in a user history of the UE 102. For example, the received advertisement displayed in the advertisement presentation widget 134 may be of a wheelchair, which may not be germane to a user associated with the UE 102. The UE 102 may receive the input of the first UI control 135a, determine the subject of the advertisement in the advertisement presentation widget 134 by reading a uniform resource locator (URL) that is appended to the advertisement, and send a user history modification request to a history moderator server 112 that moderates requests for user history modification. An example of a URL that the history moderator server 112 may extrapolate a subject of the advertisement may be "www.wheelchairemporium.com." The history moderator server 112 may notice that the word "wheelchair" is listed in the URL and determine that the subject of the advertisement is related to that. The second control UI 135b may allow the UE 102 to delete the advertisement presentation widget 134. In an embodiment, the advertisement presentation widget 134 may be deleted a pre-defined amount of times before deleting the advertisement presentation widget 134 becomes unavailable. The pre-defined amount of deletions via the second control UI 135b may be five deletions per day or another amount of deletions via the second control UI 135b per day.

The advertisement presentation widget 134 may also present on the display 132 of the UE 102 a separate control function or dialog box for the user to define what the subject of the advertisement displayed in the advertisement presentation widget 134 is and comment as to why the user does not want to see the advertisement. These comments may be stored in a local dictionary on the UE 102 or they may be stored remotely in a remote dictionary or list that may be aggregating from many UEs such as the UE 102. The comments stored in the remote dictionary may be periodically distributed to UEs such as the UE 102 so that, responsive to the first UI control 135a for disassociation from a subject of an advertisement being selected, the advertisement presentation widget 134 may present a list of reasons for the user of the UE 102 to select as to why they do not want to see the advertisements related to the subject of the advertisement displayed in the advertisement presentation widget 134. These reasons may include options such as "not interested," "not useful," "already bought or am about to buy product or service listed in the advertisement," and other reasons. The remote dictionary may also be built using inputs from the user via the separate UI control or dialog box, where the history moderator server 112 may query the user to define the topic or subject that is associated to a URL. The more inputs from users there are, the more comprehensive the list of URLs with coinciding defined topics the history moderator server 112 may use to determine a subject of an advertisement based on the URL of the advertisement. This will make the processing of history modification requests efficient as opposed to not having a remote dictionary of URLs with defined subjects. If the history moderator server 112 is able to discover a subject of the advertisement based on the URL, the dialog box may not be presented, but if the history moderator server 112 is unable to discover the subject of an advertisement based on the URL, the dialog box may be presented so that the subject of the advertisement may be associated with URL and appended to the remote dictionary. The dialog box may be presented so that the user may define why they do not want to see the advertisement.

With this information, the history moderator server 112 either validates or does not validate the user history modification request sent by the UE 102. If the history moderator server 112 validates the user history modification request, future advertisements related to, in this instance, wheelchairs, may not be selected by an advertisement server based on the history modification request of the UE 102.

Figure 1C:
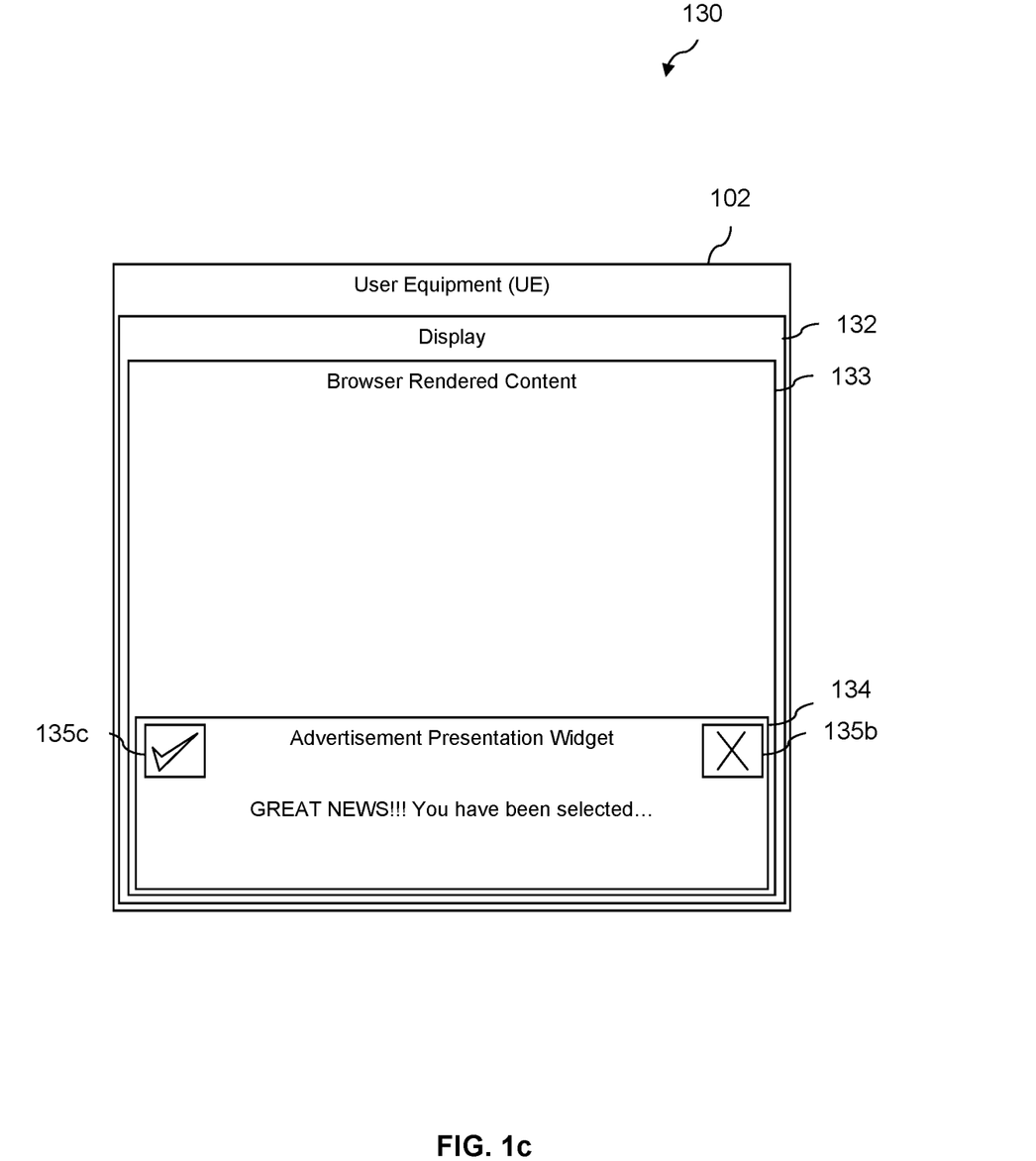
FIG. 1c is a block diagram of a system according to an embodiment of the disclosure.

In FIG. 1c, a substantially similar system 130 is described. The system 130 comprises the UE 102 which comprises the display 132, which displays the browser rendered content 133, which displays the advertisement presentation widget 134. The advertisement presentation widget 134 comprises the second UI control 135b, but no longer displays the same first UI control 135a as illustrated in FIG. 1b. The first UI control 135a has transformed into a separate UI control 135c. The separate UI control 135c, represents a validation of a user history modification request by the aforementioned history moderator server 112 discussed in the system 130.

Figure 2:
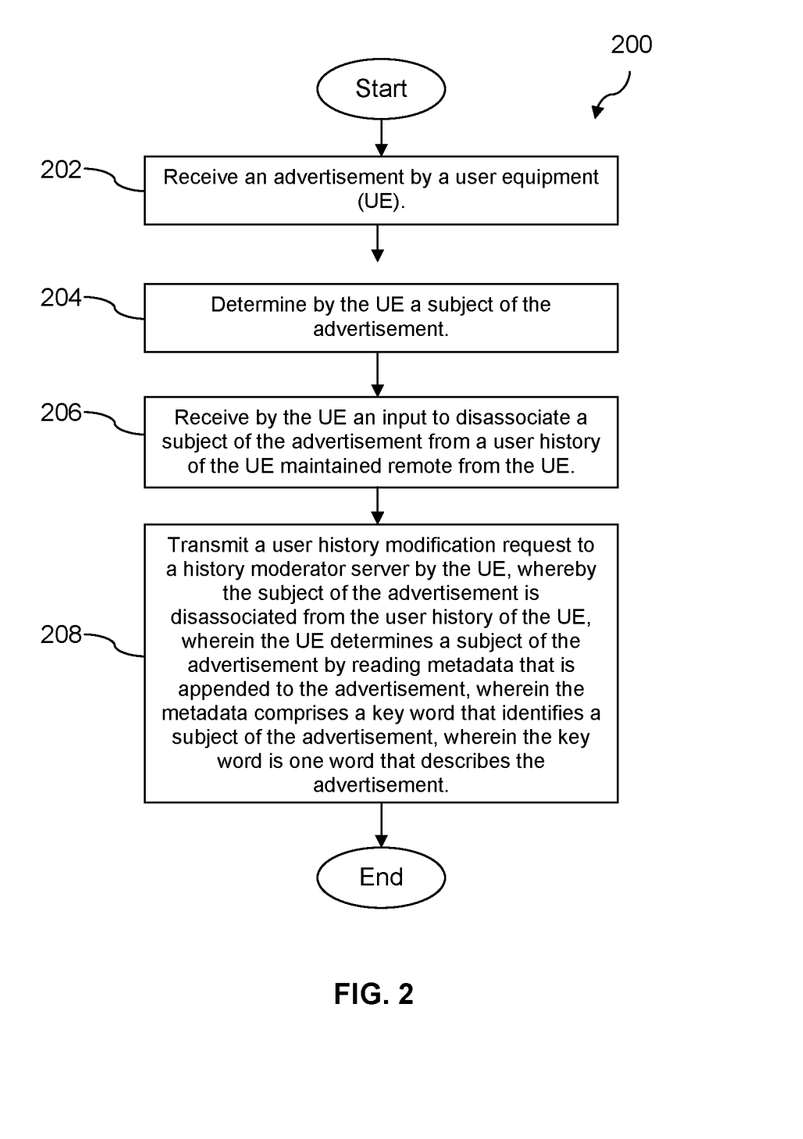
FIG. 2 is a flow chart of a method according to an embodiment of the disclosure.

In FIG. 2, a method 200 is disclosed. At block 202, a user equipment (UE) receives an advertisement. At block 204, the UE determines a subject of the advertisement. At block 206, the UE receives an input to disassociate a subject of the advertisement from a user history of the UE maintained remote from the UE. At block 208, the UE transmits a user history modification request to a history moderator server, whereby the subject of the advertisement is disassociated from the user history of the UE, wherein the UE determines a subject of the advertisement by reading metadata that is appended to the advertisement, wherein the metadata comprises a key word that identifies a subject of the advertisement, wherein the key word is one word that describes the advertisement.

Figure 3:
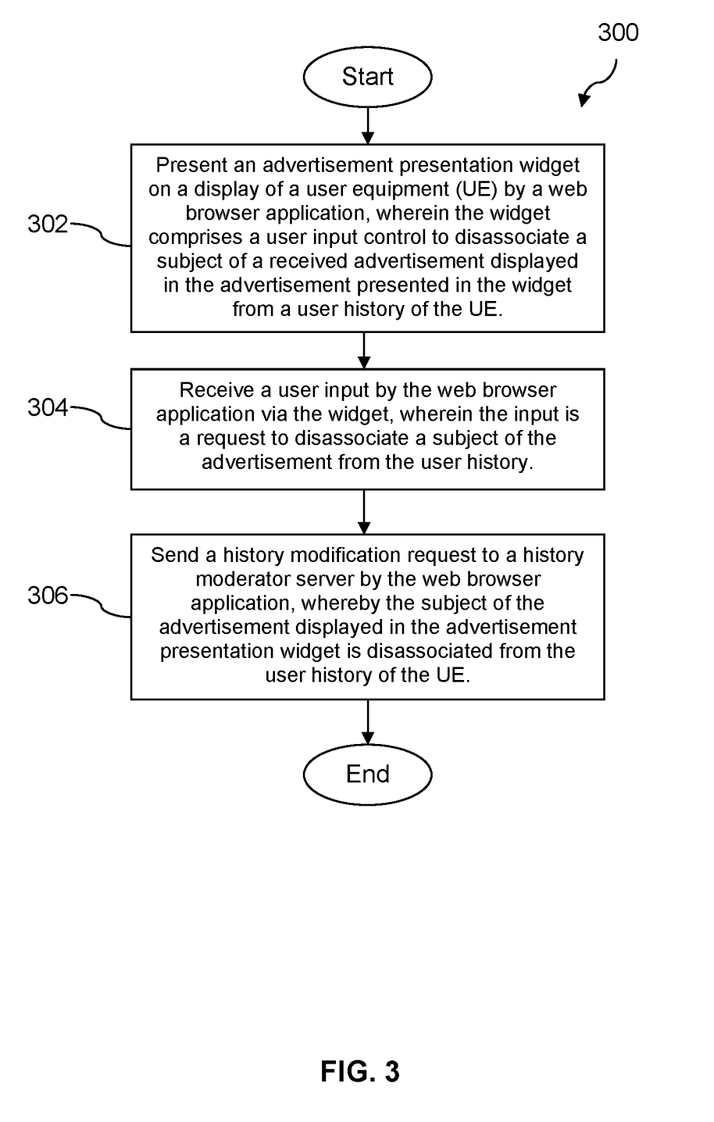
FIG. 3 is a flow chart of a method according to an embodiment of the disclosure.

In FIG. 3, a method 300 is disclosed. At block 302, a web browser application of a user equipment (UE) presents an advertisement presentation widget on a display of the UE, wherein the widget comprises a user input control to disassociate a subject of a received advertisement displayed in the advertisement presented in the widget from a user history of the UE. At block 304, the web browser application receives a user input via the widget, wherein the input is a request to disassociate a subject of the advertisement from the user history. At block 306, the web browser application sends a history modification request to a history moderator server, whereby the subject of the advertisement displayed in the advertisement presentation widget is disassociated from the user history of the UE.

Figure 4:
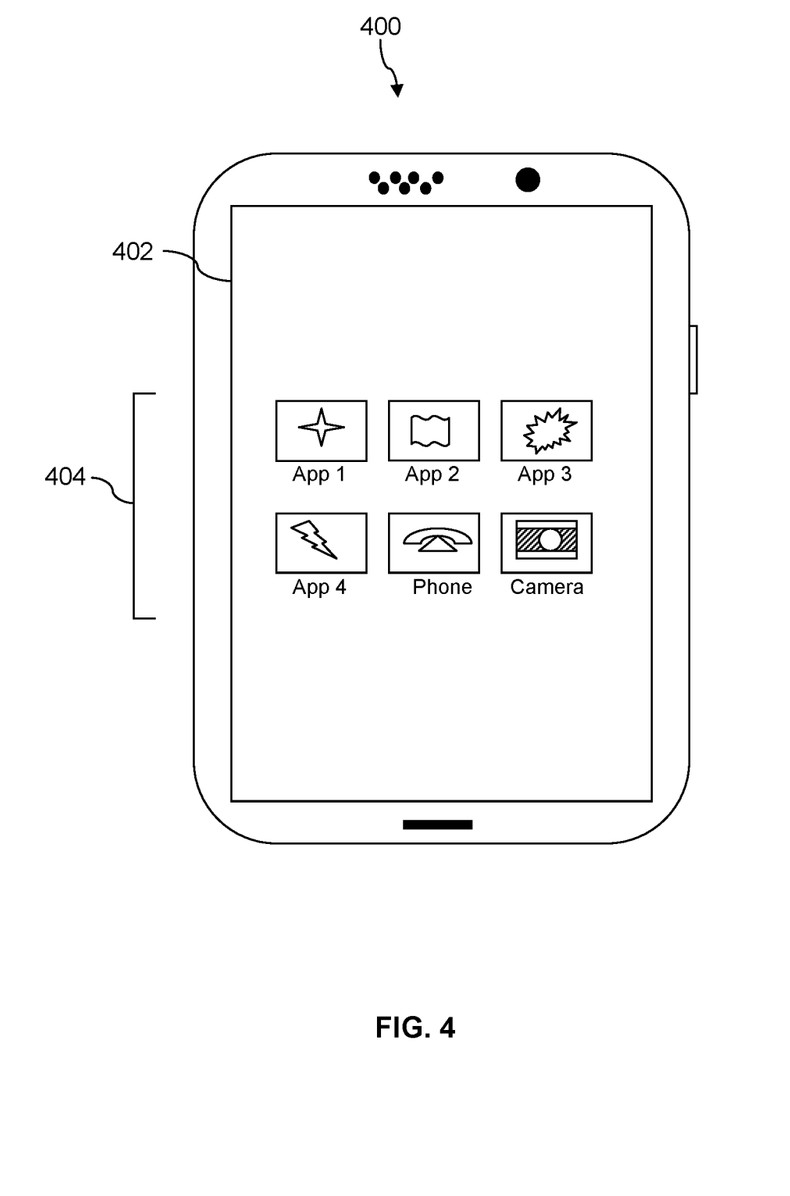
FIG. 4 is a block diagram of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
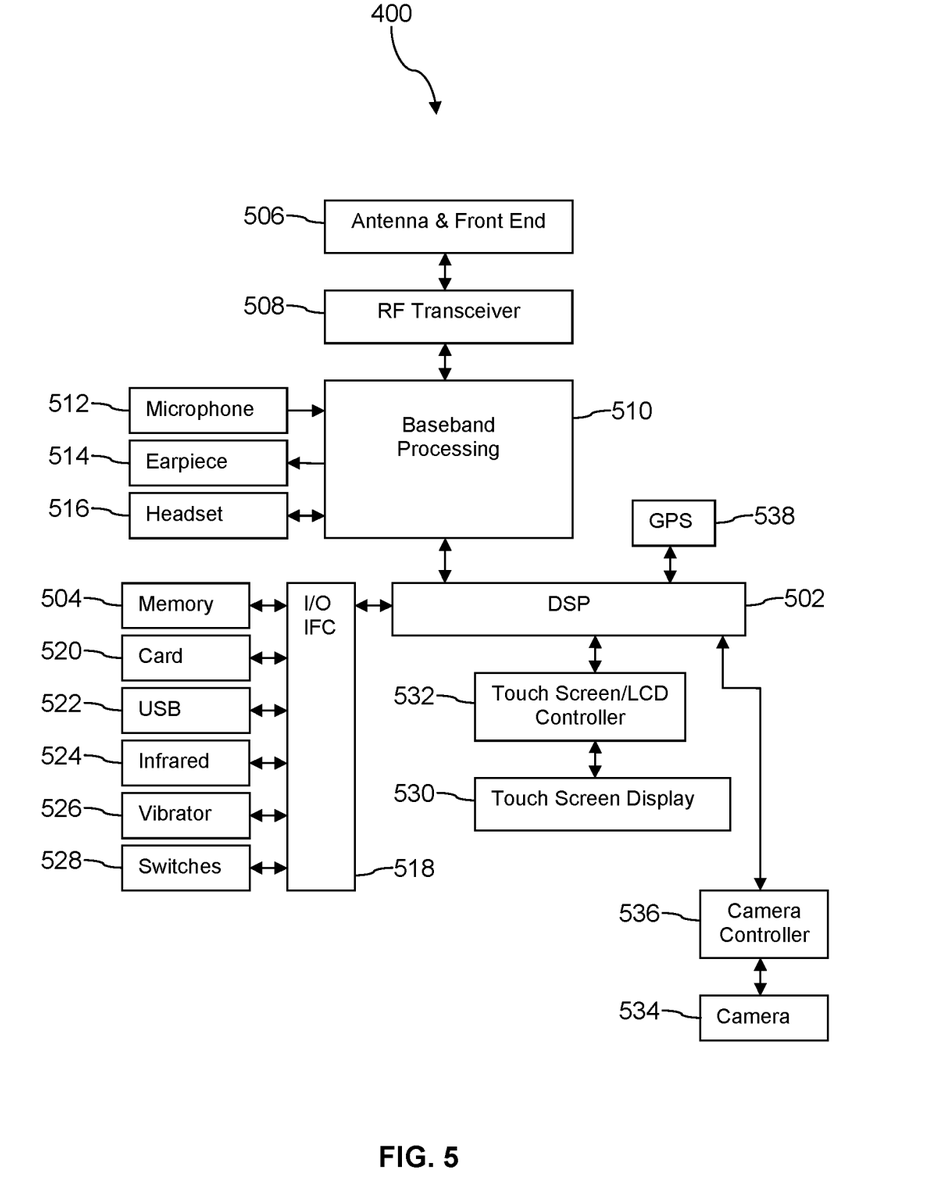
FIG. 5 is a block diagram of hardware architecture of user equipment according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
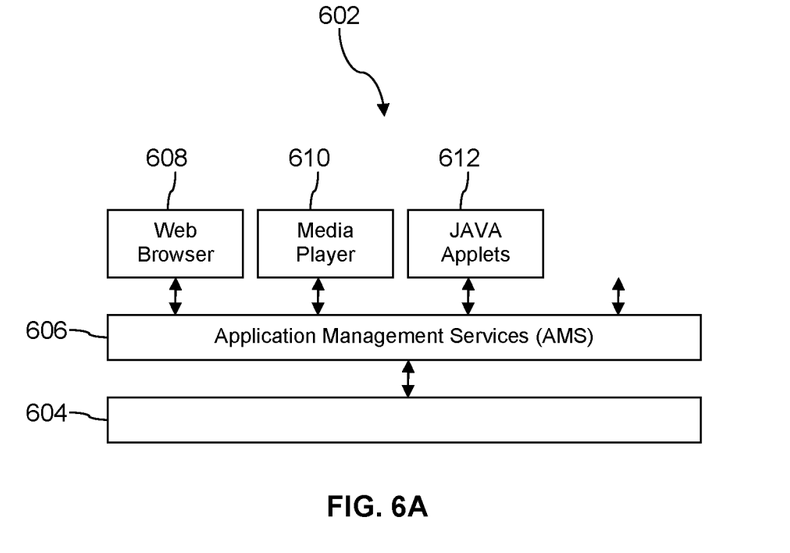
FIG. 6A is a block diagram of a software architecture of a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
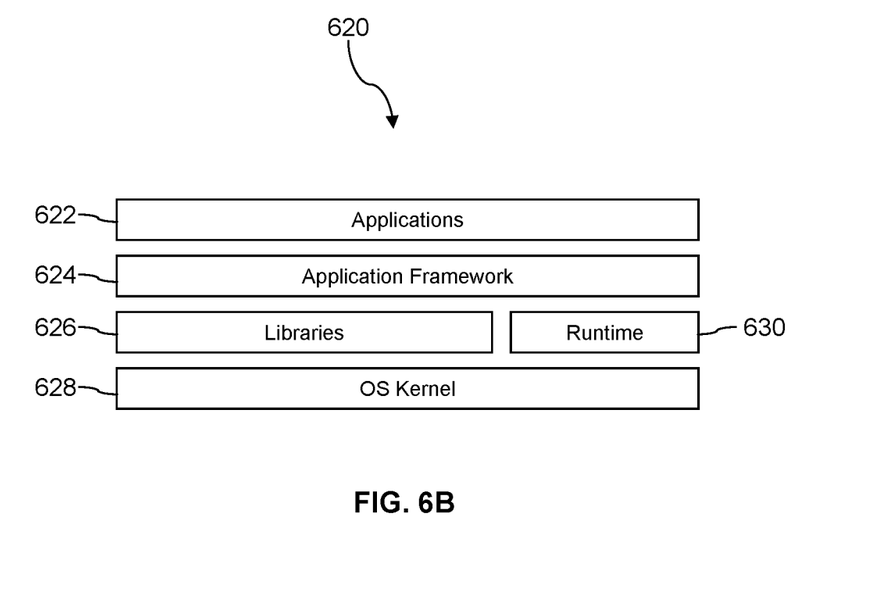
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
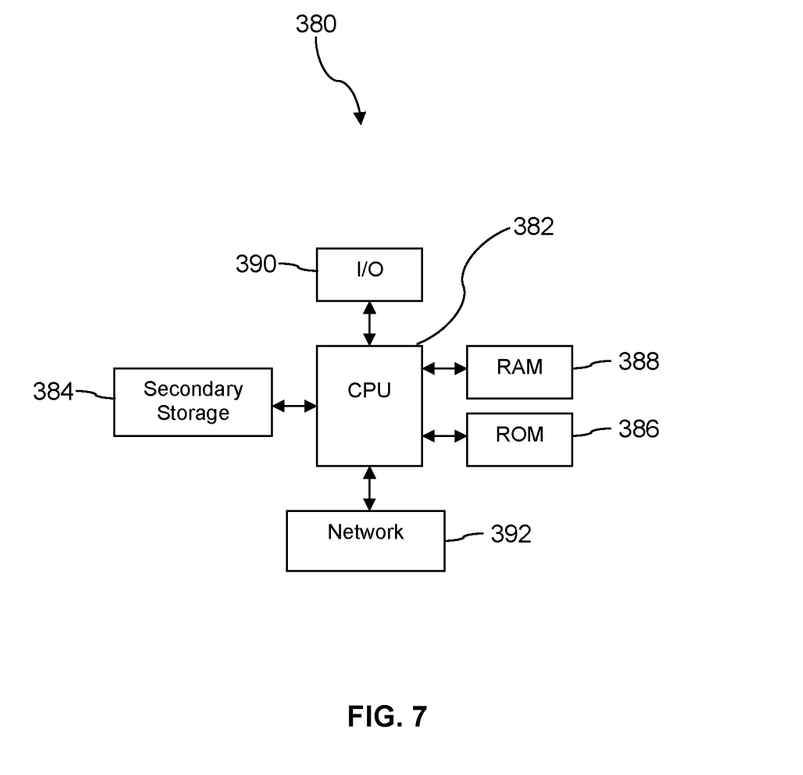
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of selectively modifying user history, comprising:
   receiving an advertisement by a user equipment (UE);
   determining by the UE a subject of the advertisement, wherein the UE determines a subject of the advertisement by reading metadata that is appended to the advertisement;
   receiving by the UE an input to disassociate the subject of the advertisement from a user history of the UE maintained remote from the UE; and
   transmitting a user history modification request to a history moderator server by the UE, wherein the user history of the UE is maintained remotely by a history manager server that, after the history moderator server validates a user history modification request and the history manager server receives the user history modification request from the history moderator server, removes the subject of the user history modification request from the user history of the UE to disassociate the subject of the advertisement from the user history of the UE, wherein the history moderator server determines a validity of the user history modification request by checking the percentage of clicks or views of the subject in the user history modification request the subject has over a predefined period of time.

2. The method of claim 1, wherein the UE is one of a mobile phone, a personal digital assistant (PDA), a media player, a tablet computer, and a laptop computer.

3. The method of claim 1, wherein a measurement of the percentage of clicks or views of the subject in user history modification requests recorded in the user history is one of five percent of clicks or views, ten percent of clicks or views, and fifteen percent of clicks or views.

4. The method of claim 1, wherein the predefined period of time is one of a day, a week, and a month.

5. The method of claim 1, wherein the UE determines the subject of the advertisement by reading a uniform resource locator (URL) that is appended to the advertisement.

6. The method of claim 1, further comprising:
   receiving, by the history moderator server, the user history modification request, wherein the user history modification request comprises metadata that identifies the subject to be disassociated from the user history of the UE;
   determining, by the history moderator server, the history manager server that maintains the user history of the UE, wherein the history manger server is one of a plurality of history manger servers;
   generating and storing, by the history moderator server, a mapping that identifies the history manager server that maintains the user history of the UE by associating the history manager server to the UE in the mapping; and
   transmitting, by the history moderator server, the user history modification request to the history manager server, wherein the history manager server removes the subject from the user history of the UE based on the user history modification request.

7. The method of claim 6, further comprising validating, by the history moderator server, the user history modification request received from the UE to determine whether the user history modification request is a valid request to remove the subject from the user history of the UE by determining if receipt of the user history modification request exceeds a threshold number of request receipts within a predefined period of time.

8. The method of claim 7, wherein the user history modification request is transmitted to the history manager server in response to validating that the user history modification request is a valid request.

9. The method of claim 6, further comprising:
   receiving a second advertisement by the UE;
   determining by the UE a second subject of the second advertisement;
   receiving by the UE an input to disassociate the second subject from the user history of the UE;
   transmitting a second user history modification request to the history moderator server by the UE, wherein the second user history modification request comprises metadata that identifies the second subject to be disassociated from the user history of the UE;
   receiving, by the history moderator server, the second user history modification request; and
   transmitting, by the history moderator server, the second user history modification request to the history manager server based on the generated and stored mapping, wherein the history manager server removes the second subject from the user history of the UE based on the second user history modification request.

10. The method of claim 9, further comprising validating, by the history moderator server, the second user history modification request received from the UE to determine whether the second user history modification request is a valid request to remove the second subject from the user history of the UE by determining if receipt of the second user history modification request exceeds a threshold number of request receipts within a predefined period of time.

11. The method of claim 10, wherein the second user history modification request is transmitted to the history manager server in response to validating that the second user history modification request is a valid request.

12. The method of claim 9, wherein the UE determines a subject of the advertisement by reading metadata that is appended to the second advertisement.

13. The method of claim 12, wherein the metadata that is appended to the second advertisement comprises a key word that identifies the second subject of the second advertisement, and wherein the key word is one word that describes the second advertisement.

14. The method of claim 9, wherein the UE determines the second subject of the second advertisement by reading a uniform resource locator (URL) that is appended to the second advertisement.

15. The method of claim 1, wherein the metadata comprises a key word that identifies the subject of the advertisement, and wherein the key word is one word that describes the advertisement.

16. The method of claim 1, wherein the user history is compiled based on communication events initiated by the UE and is associated with content that is sent to the UE.

17. The method of claim 16, wherein the user history is comprised of communication events selected from among clicks, views, or visits of web sites by a web browser application on the UE.

18. The method of claim 1, wherein the input to disassociate the subject of the advertisement from the user history of the UE is received via an advertisement presentation widget displayed on the by a web browser application.

* * * * *